US012449308B2

(12) United States Patent
Ng et al.

(10) Patent No.: US 12,449,308 B2
(45) Date of Patent: Oct. 21, 2025

(54) PORTABLE BIOSENSOR FOR AIR SAMPLE

(71) Applicant: The United States of America, as represented by the Secretary of the Navy, Crane, IN (US)

(72) Inventors: Kin Chiu Ng, Fresno, CA (US); Subrata Sanyal, Eastvale, CA (US)

( * ) Notice: Subject to any disclaimer, the term of this patent is extended or adjusted under 35 U.S.C. 154(b) by 210 days.

(21) Appl. No.: 18/123,679

(22) Filed: Mar. 20, 2023

(65) Prior Publication Data

US 2023/0296526 A1 Sep. 21, 2023

Related U.S. Application Data

(60) Provisional application No. 63/321,398, filed on Mar. 18, 2022.

(51) Int. Cl.
| | |
|---|---|
| *G01N 21/65* | (2006.01) |
| *G01J 3/02* | (2006.01) |
| *G01J 3/44* | (2006.01) |
| *G01N 21/64* | (2006.01) |
| *G06V 40/13* | (2022.01) |

(52) U.S. Cl.
CPC ........... *G01J 3/4412* (2013.01); *G01J 3/0202* (2013.01); *G01J 3/0227* (2013.01); *G01J 3/0229* (2013.01); *G01J 3/0272* (2013.01); *G01J 3/0275* (2013.01); *G01J 3/0286* (2013.01); *G01N 21/6486* (2013.01); *G01N 21/65* (2013.01); *G06V 40/1318* (2022.01); *G01N 2201/0221* (2013.01); *G01N 2201/06113* (2013.01)

(58) Field of Classification Search
CPC ...... G01J 3/4412; G01J 3/0202; G01J 3/0227; G01J 3/0229; G01J 3/0272; G01J 3/0275; G01J 3/0286; G06V 40/1318; G01N 21/6486; G01N 21/65; G01N 2201/0221; G01N 2201/06113
See application file for complete search history.

(56) References Cited

U.S. PATENT DOCUMENTS

2021/0018366 A1* 1/2021 Ng ............................ G01J 3/10

* cited by examiner

*Primary Examiner* — Jamil Ahmed
(74) *Attorney, Agent, or Firm* — Naval Surface Warfare Center, Crane Division; Christopher John Feigenbutz

(57) ABSTRACT

Provided is a portable biosensor that includes a sample filter cartridge, a filter collector, an optical sphere, an electromagnetic radiation emitter, a photo-detector, a processor, a signal display, a vacuum pump, and a power supply. The sample filter cartridge selectively removes small molecules to minimize spectral interference in the detection signal. The sample is concentrated onto the filter collector and subjected to illumination by the electromagnetic radiation emitter, producing Raman-scattering. The optical sphere collects and distributes the Raman-scattering shifts, which then pass through a spectral filter to produce spectral filtered scattering, which is then reflected by the concave holographic flat-field grating onto the photo-detector. The data is displayed graphically to provide the Raman-scattering shift data. The data is compared with a database for sample identification. The device is contained within a housing that is small enough to be easily transported for field use.

16 Claims, 6 Drawing Sheets

PORTABLE BIOSENSOR FOR AIR SAMPLE

CROSS-REFERENCE TO RELATED APPLICATIONS

The present application claims priority to U.S. Provisional Patent Application Ser. No. 63/321,398, filed Mar. 18, 2022, entitled "PORTABLE VIRUS SENSOR IN AIR," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 210986US02) is assigned to the United States Government and is available for licensing for commercial purposes. Licensing and technical inquiries may be directed to the Technology Transfer Office, Naval Surface Warfare Center Corona Division, email: CRNA_CTO@navy.mil.

FIELD OF THE INVENTION

The field of invention relates generally to air sensors. More particularly, it pertains to a portable biosensor for air sample.

BACKGROUND

Rapid, reliable, accurate, and early detection for biological protein samples, such as viral particles is always in constant demand globally. The COVID-19 outbreak revealed inadequate technologies in meeting this demand, as accurate PCR assays require at least 24 hours for results, making quick clinical decisions impractical. Alternative means for testing include chemical instruments, including those based on spectroscopy, electrochemistry, and microscopy. As an example, spectroscopy based methods include light-scattering spectrometry, absorption spectrometry, fluorescence spectrometry, mass spectrometry, and Raman scattering spectrometry. One limitation with these spectrometric instruments are they are generally lab-based. While portable devices have been developed and are commercially available, these portable units are used on liquid and/or solid samples.

Among these spectrometers, ones based on Raman Scattering are the most popular. Raman excitation generates Raman Scattering shifts (peaks) to a wavelength region with high fluorescence signal. Raman Scattering Spectrometry is capable of finger-print identification of a substance of interest, however, this technique usually generates a weak signal for detection. Another technique, Light Scattering Spectrometry, has shown potential for viral detection, as it provides particle-size information. This technique, however, provides no chemical information. A combination of these two spectrometric techniques appears promising for viral particle detection, however, current hardware devices that are known and utilized in the art are too bulky and complicated to be packaged into a small portable/hand-held unit. As is evident from the above, a portable biosensor that combines Raman Scattering Spectrometry and for detecting viral particles in an air sample is desirable.

SUMMARY OF THE INVENTION

The present invention relates to a portable biosensor comprising: a sample filter cartridge; a first air passage; a filter collector; an optical sphere; an electromagnetic radiation emitter; a photo-detector configured to receive electromagnetic spectrum data; a processor in electrical communication with the photo-detector to receive the electromagnetic spectrum data from the photo-detector; a signal display in electrical communication with the processor and configured to provide an indication of the electromagnetic spectrum data; a second air passage; a vacuum pump for drawing an air sample from the sample filter cartridge, through the first air passage, the filter collector, the optical collector, and the second air passage and out the vacuum pump; and a power supply in electrical communication with the electromagnetic radiation emitter, the photo-detector, the processor, the signal display, and the vacuum pump.

The sample filter cartridge selectively removes small molecules such as water, ammonia, and carbon dioxide in order to minimize spectral interference in the detection signal. The sample is collected and concentrated onto the filter collector and subjected to illumination by the electromagnetic radiation emitter, producing intense scattering. The optical sphere collects and uniformly distributes the Raman-scattering shifts at a wall of the optical sphere, causing the Raman-scattering shifts to exit the optical sphere and to pass through a spectral filter, which produces spectral filtered scattering. The spectral filtered scattering is collected, separated, and reflected by the concave holographic flat-field grating onto the photo-detector, which is then converted into electrical signals and is displayed graphically by the signal display to provide an indication of the electromagnetic spectrum data comprising the Raman-scattering shift data. The data is compared with a database for sample identification. The device is contained within a housing that is small enough to be easily transported for field use (approximately the size of a small shoe-box).

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
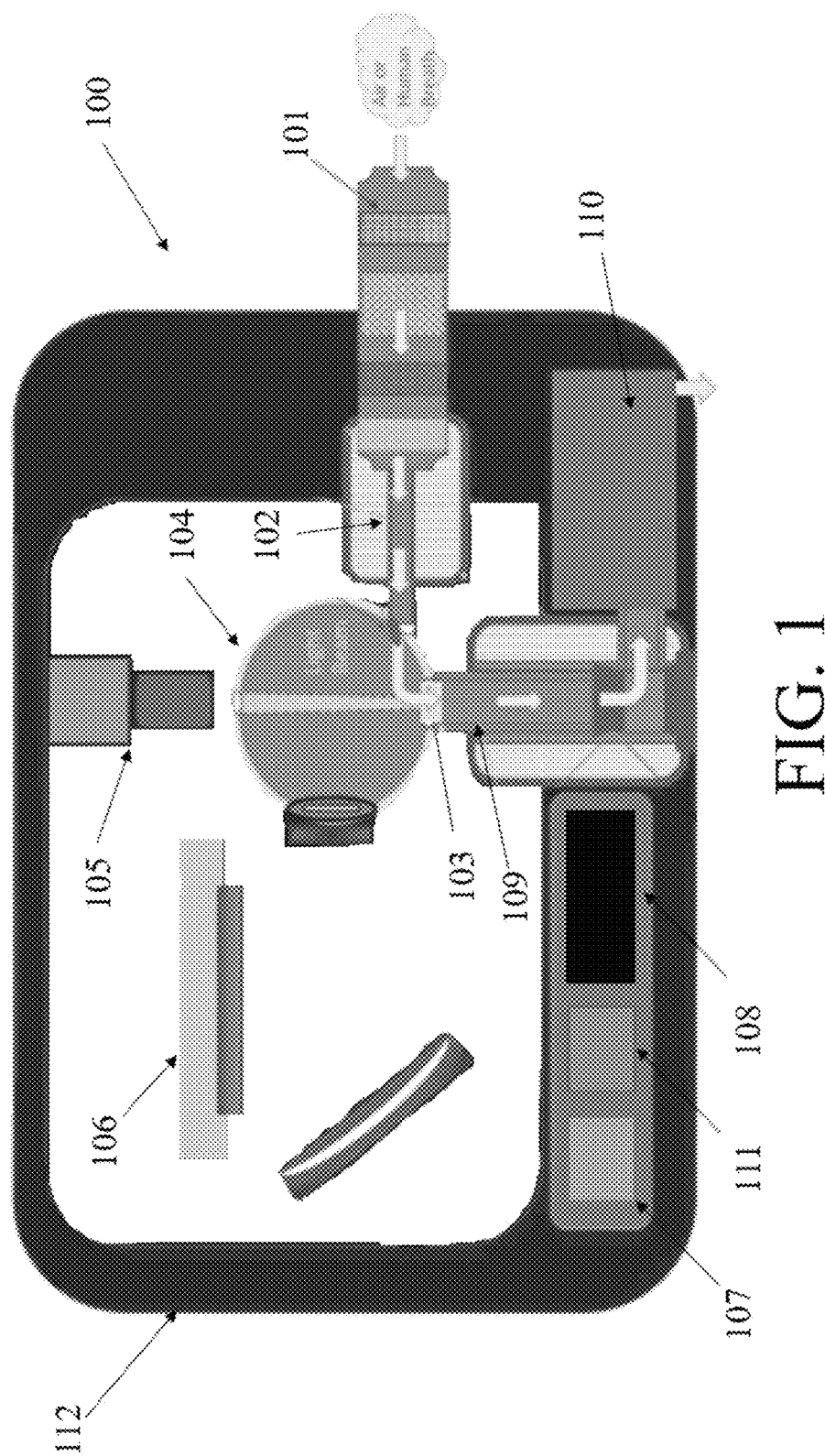
FIG. 1 shows the portable virus sensor.

The embodiments of the invention described herein are not intended to be exhaustive or to limit the invention to precise forms disclosed. Rather, the embodiments selected for description have been chosen to enable one skilled in the art to practice the invention.

Generally, provided is a portable biosensor comprising: a sample filter cartridge; a first air passage; a filter collector; an optical sphere; an electromagnetic radiation emitter; a photo-detector configured to receive electromagnetic spectrum data; a processor in electrical communication with the photo-detector to receive the electromagnetic spectrum data from the photo-detector; a signal display in electrical communication with the processor and configured to provide an indication of the electromagnetic spectrum data; a second air passage; a vacuum pump for drawing an air sample from the sample filter cartridge, through the first air passage, the filter collector, the optical collector, and the second air passage and out the vacuum pump; a power supply in electrical communication with the electromagnetic radiation emitter, the photo-detector, the processor, the signal display, and the vacuum pump; and a housing that is sized for portability of said biosensor for field use.

In an illustrative embodiment, the sample filter cartridge further comprises a 30 μm pore size mesh filter, a 1.0 μm pore size coarse filter, a 0.5 μm pore size medium filter, 0.5 μm pore size fine filter, and a molecular-sieve bead-column. In an illustrative embodiment, the electromagnetic radiation emitter further comprises a Ramen spectrometer laser diode. In an illustrative embodiment, the spectrometer laser diode emits a deep ultra-violet radiation wavelength of 180 nm to 250 nm at a sample collected on the filter collector. In an illustrative embodiment, the sample collected on the filter collector absorbs the radiation and generates Raman-scattering shifts comprising finger-print spectral peaks that are about 30 nm longer than the emitted radiation in a fluorescence-free spectral region. In an illustrative embodiment, the optical sphere collects and uniformly distributes the Raman-scattering shifts at a wall of the optical sphere, causes the Raman-scattering shifts to exit the optical sphere and to pass through a spectral filter selected from the group consisting of a notch filter, a band-pass filter, and a long-pass spectral filter to produce spectral filtered scattering, wherein the spectral filter blocks scattering radiation produced by the electromagnetic radiation emitter. In an illustrative embodiment, the spectral filtered scattering is collected, separated, and reflected by a concave holographic flat-field grating onto the photo-detector. In an illustrative embodiment, the spectral filtered scattering data is collected from the photo-detector and is displayed graphically by the signal display to provide an indication of the electromagnetic spectrum data comprising the Raman-scattering shift data. In an illustrative embodiment, the Raman-scattering shift data is compared with a database for sample identification.

The biosensor provides an effective, low-cost, small size, low weight, simple, easy to use device with point-of-care/remote operation for accurate and rapid sample detection/testing. In an illustrative embodiment, the sample is a human breath sample. In an illustrative embodiment, the human breath sample is tested for viral particles. In an illustrative embodiment, the viral particles are COVID-19 viral particles. In an illustrative embodiment, testing is done directly on the virus sample without the need for time-consuming polymerase chain reaction (PCR) processes.

FIG. 1 shows the portable biosensor 100. In an illustrative embodiment, the device comprises a sample filter cartridge 101; a first air passage 102; a filter collector 103; an optical sphere 104; an electromagnetic radiation emitter 105; a photo-detector 106; a processor 107; a signal display 108; a second air passage 109; a vacuum pump 110; and a power supply 111. In an illustrative embodiment, the portable biosensor 100 is contained within a housing 112 that is sized for portability and for field use In an illustrative embodiment, the biosensor is contained within a housing 112 approximately the size of a small shoe-box.

Figure 2:
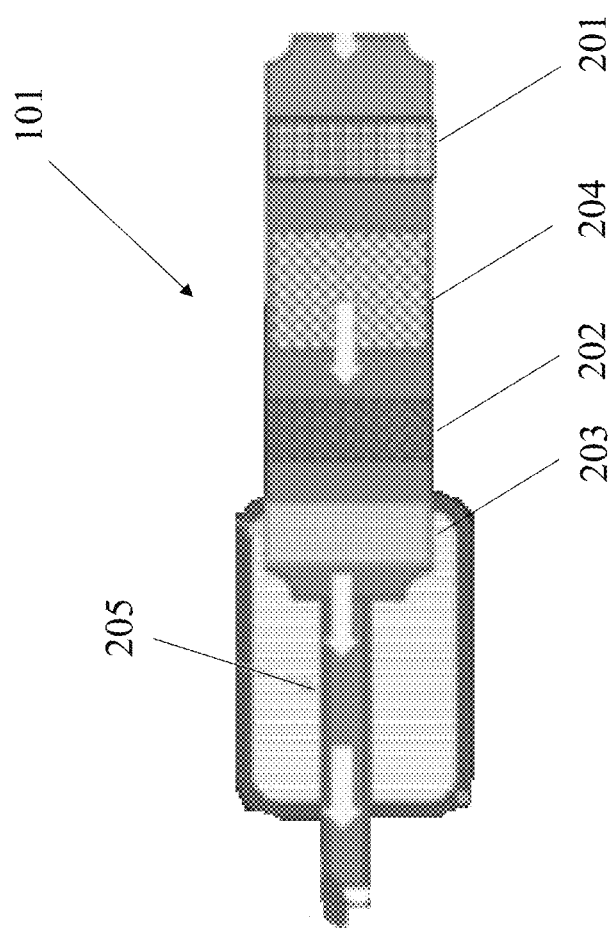
FIG. 2 shows a close-up view of the sample filter cartridge.

FIG. 2 shows a close-up view of the sample filter cartridge 101. In an illustrative embodiment, the sample filter cartridge 101 selectively removes small molecules such as water (resulting in dry-particles for accurate sizing), ammonia, and, carbon dioxide (for minimizing and avoiding spectral interference in the detection signal), and detect particles in the 50-150 nm size-range by providing a spectral sample finger-print for comparison to samples in a database. The removal of small molecules is achieved with one or more filters contained in the sample filter cartridge 101.

In an illustrative embodiment, is constructed of plastic and further comprises a 30 μm pore size mesh filter 201, a 1.0 μm pore size coarse filter 202, a 0.5 μm pore size medium filter 203, and a molecular-sieve bead-column 204. The sampling-air will be vacuum-drawn into the cartridge 101 and through the mesh filter 201 for preventing entrance of larger particles, the bead-column 204 for removing small chemical molecules, coarse filter 202 and medium filter 203 for removing large and medium sized particles, respectively, and finally through the fine filter for collecting and concentrating small (50-150 nm) particles. In an illustrative embodiment, one or more of the filters are disposable. The sample filter cartridge 101 allows air to flow therethrough and is attached to the first air passage 205 in a secure manner. In an illustrative embodiment, the bead-column 204 contains synthetic crystals with small pores. The size of the pores determines what size molecules can enter and be trapped. As a non-limiting example, a pore diameter of ~3 angstroms (A) will trap molecules of that size or smaller; and therefore molecules of water, ammonia, and carbon dioxide will be trapped and removed from the air stream. In an illustrative embodiment, beads (~10 mesh) can be packed as a column segment in the cartridge 101.

Figure 3:
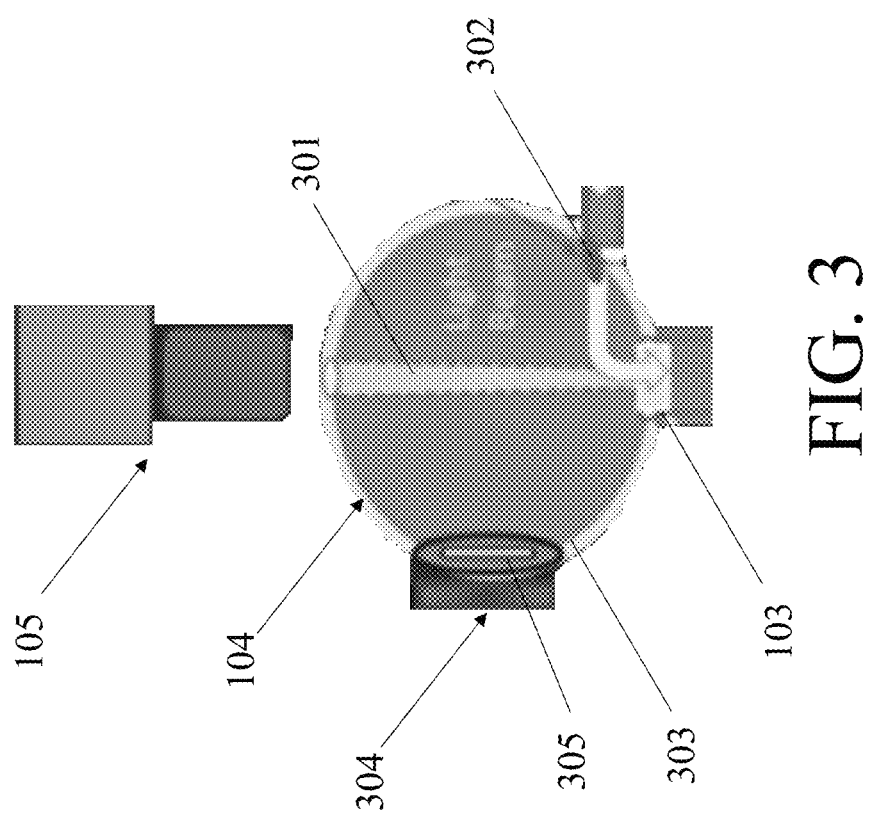
FIG. 3 shows a view of the filter collector, optical sphere, and electromagnetic radiation emitter.

FIG. 3 shows a view of the filter collector 103, optical sphere 104, and electromagnetic radiation emitter 105. In an illustrative embodiment, the filter collector 103 is a 0.5 μm pore size fine filter. In an illustrative embodiment, electromagnetic radiation passes through an optical port 301 of several mm in diameter, and is directed and focused onto the filter collector 103, where Raman excitation on particles takes place. The sample will be collected and concentrated onto the filter collector 103 and subjected to illumination by the electromagnetic radiation emitter 105, producing intense scattering. The amount of sample particles concentrated onto the filter collector 103 is directly proportional to the length of collection time.

In an illustrative embodiment, the filter collector 103 comprises a ceramic-filter embedded with nanoparticles of gold, silver, copper, semiconductor quantum dots, and/or graphene oxide. In an illustrative embodiment, the filter collector 103 comprises a metal filter such as silver filter. The small dimension will maximize particle-concentrating and sample-exposure to the illumination beam, and the nanoparticles or silver surface will greatly enhance the intensity of Raman scattering. In an illustrative embodiment, the filter collector 103 can be constructed of aluminum oxide, polycarbonate, or silver. In an illustrative embodiment, a silver filter can be used directly without surface modification.

In an illustrative embodiment, the electromagnetic radiation emitter 105 further comprises a Ramen spectrometer laser diode. In an illustrative embodiment, the Ramen spectrometer laser diode employs a laser diode or excimer lamp for providing a deep ultra-violet (UV) radiation within the range of 180-250 nm wavelength. The sample on the filter collector 103 absorbs radiation and generates Raman-Scattering shifts as finger-print spectral peaks, within ~30 nm longer than the source radiation to a fluorescence-free spectral region for detection, with the characteristic peaks appearing in the range of about 350-3800 cm-1.

Raman Scattering Spectrometry (Layman Theory) is a technique that utilizes a high intensity illumination source (in the present case, a Ramen spectrometer laser diode) to strike and "shake" a sample of interest, causing the sample release "peaks". The peaks are spectrally (in term of wavelength or wave number) shifted away from the shaking light (wavelength). Identification of these peaks leads to a "fingerprint spectrum" for the substance of interest. The inventive device utilizes a laser diode of deep-UV wavelength that is resonantly absorbed by protein sample, which in turn generates high peaks for detection. The additional benefit for the deep-UV shifted peaks is that they appear in a fluorescence free spectral region.

As can be appreciated, a common Raman shift problem is that the peaks overlap in high fluorescence region, causing peak identification difficult. The inventive biosensor overcomes this problem by generating Raman-Scattering shifts in a fluorescence-free region, which results in a high signal-to-background ratio for improved detection. The optical sphere 104 is closed when the air-inlet 302 is open for sample collection, and is closed to prevent ambient light-entrance and laser-exposure during detection.

Additionally, the Raman effect is strongly enhanced by several orders of magnitude if the sample substrate contains a shiny, reflective, nano-metal-particles (silver, gold, copper), which is known as Surface Enhance Raman Scattering. This enhancement is caused by more effective energy dissipation on the sample of interest via a partially metal "plasmonic" effect. In an illustrative embodiment, the sample is embedded with nanoparticles, including metals, crystals of semi-conductor materials, and organics, such as graphene and graphene oxides. In an alternate embodiment, metal-filters a silver-filter can be utilized.

The optical sphere 104 collects and uniformly distributes the Raman-scattering shifts at a wall 303 of the optical sphere 104, causing the Raman-scattering shifts to exit the optical sphere 104 and to pass through a spectral filter 304 selected from the group consisting of a notch filter, a band-pass filter, and a long-pass spectral filter. The spectral filter 304 produces spectral filtered scattering, wherein the spectral filter 304 blocks scattering radiation produced by the electromagnetic radiation emitter 105. The spectral filter 304 blocks the source (laser/lamp) scattered radiation (which generates high background) but passes Raman Scattering radiation (detects as signal), at the optical slit 305. A key consideration for selecting a suitable spectral-filter is that the Raman Scattering "peaks" in general, will shift several nanometer to about 30 nanometer longer than the source radiation wavelength employed.

Figure 4:
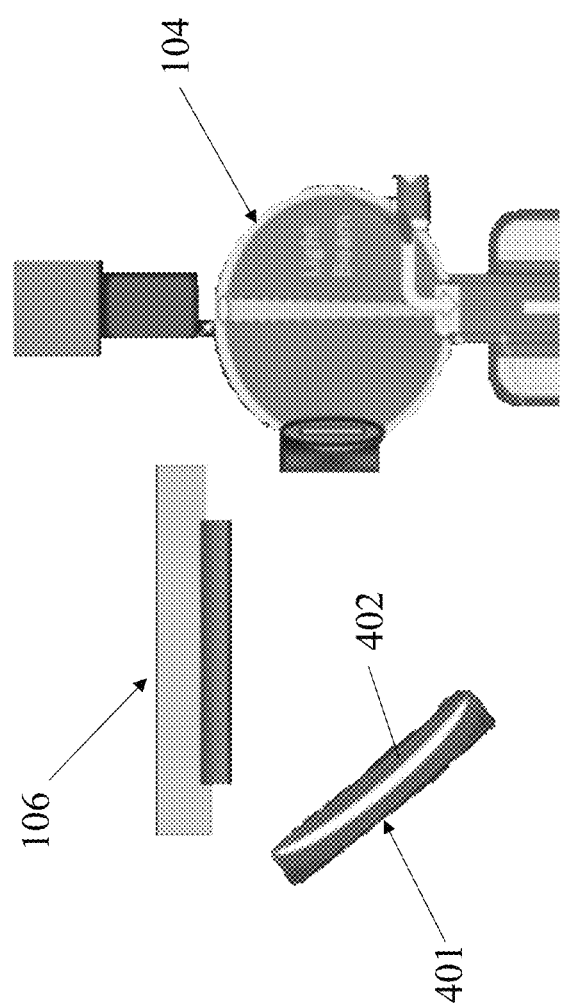
FIG. 4 shows a close-up view of the optical sphere, the photo-detector, and the concave holographic flat-field grating.

FIG. 4 shows a close-up view of the optical sphere 104, the photo-detector 106, and the concave holographic flat-field grating 401. The grating component separates the radiation, while the concave-mirror component 402 reflects and focuses the separated "color-images" onto the photo-detector 106. The multiple-function capability of the concave holographic flat-field grating 401 reduces the number of optical components, allowing for the construction of a compact device and the reduction of scattered light, in turn providing a high signal-to-noise signal for detection.

In an illustrative embodiment, the spectral filtered scattering is collected, separated, and reflected by the concave holographic flat-field grating 401 onto the photo-detector 106. In an illustrative embodiment, the photo-detector 106 is a tall charge-coupled device detector (CCD) array. In an illustrative embodiment, the CCD height matches the image height of the spectral filtered scattering, allowing for optimal detection.

The CCD senses the spectrum of light-ray dispersed by the grating 401, converts the spectrum into electrical signals, and outputs the result. In an illustrative embodiment, the CCD is constructed with an array of pixel sensing-elements. In an illustrative embodiment, the pixel size is between 10-30 In an illustrative embodiment, a cooled CCD can be utilized to reduce background noise. In an illustrative embodiment, an uncooled CCD is used for enhanced portability.

Figure 5:
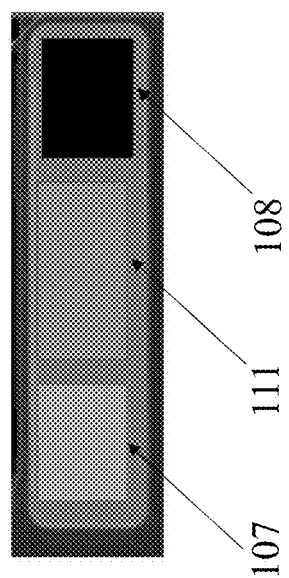
FIG. 5 shows a close-up view of the processor, signal display, and power supply.

FIG. 5 shows a close-up view of the processor 107, signal display 108, and power supply 111. In an illustrative embodiment, the spectral filtered scattering data is collected from the CCD and is displayed graphically by the signal display 108 to provide an indication of the electromagnetic spectrum data comprising the Raman-scattering shift data. The power supply 111 is in electrical communication with the electromagnetic radiation emitter, the photo-detector, the processor 107, the signal display 108, and the vacuum pump. In an illustrative embodiment, the power supply 111 is a battery. In an illustrative embodiment, the power supply 111 is utilizes alternating current through an electrical outlet.

Figure 6:
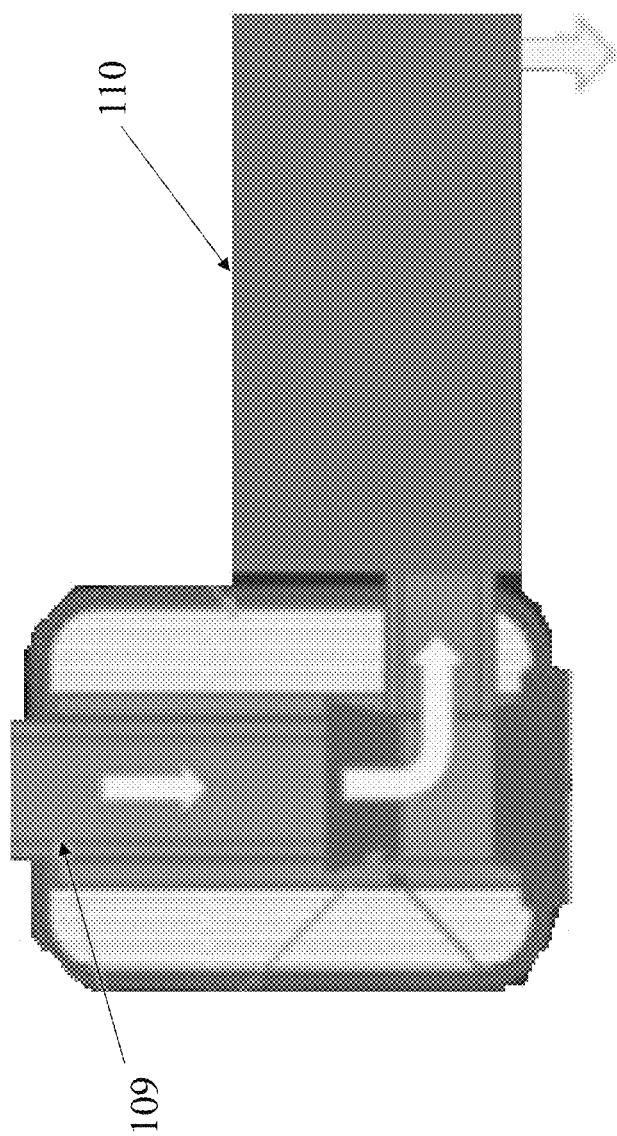
FIG. 6 shows a close-up view of the second air passage and vacuum pump.

FIG. 6 shows a close-up view of the second air passage 109 and vacuum pump 110. In an illustrative embodiment, the vacuum pump 110 draws an air sample from the sample filter cartridge, through the first air passage, the filter collector, the optical collector, and the second air passage and out the vacuum pump.

Although the invention has been described in detail with reference to certain preferred embodiments, variations and modifications exist within the spirit and scope of the invention as described and defined in the following claims.

The invention claimed is:
1. A portable biosensor comprising:
a sample filter cartridge comprising a 30 µm pore size mesh filter, a 1.0 µm pore size coarse filter, a 0.5 µm pore size medium filter, and a molecular-sieve bead-column;
a first air passage;
a filter collector;
an optical sphere;
an electromagnetic radiation emitter;
a photo-detector configured to receive electromagnetic spectrum data;
a processor in electrical communication with said photo-detector to receive said electromagnetic spectrum data from said photo-detector;
a signal display in electrical communication with said processor and configured to provide an indication of said electromagnetic spectrum data;
a second air passage;
a vacuum pump for drawing an air sample from said sample filter cartridge, through said first air passage, said filter collector, said optical sphere, and said second air passage and out said vacuum pump;
a power supply in electrical communication with said electromagnetic radiation emitter, said photo-detector, said processor, said signal display, and said vacuum pump; and a housing that is sized for portability of said biosensor for field use.

2. The biosensor of claim 1, wherein said electromagnetic radiation emitter further comprises a Raman spectrometer laser diode.

3. The biosensor of claim 2, wherein said Raman spectrometer laser diode emits a deep ultra-violet radiation wavelength of 180 nm to 250 nm at a sample collected on said filter collector.

4. The biosensor of claim 3, wherein said sample collected on said filter collector absorbs said radiation and generates Raman-scattering shifts comprising finger-print spectral peaks that are about 30 nm longer than said emitted radiation in a fluorescence-free spectral region.

5. The biosensor of claim 4, wherein said optical sphere collects and uniformly distributes said Raman-scattering shifts at a wall of said optical sphere, causes said Raman-scattering shifts to exit said optical sphere and to pass through a spectral filter selected from the group consisting of a notch filter, a band-pass filter, and a long-pass spectral filter to produce spectral filtered scattering, wherein said spectral filter blocks scattering radiation produced by said electromagnetic radiation emitter.

6. The biosensor of claim 5, wherein said spectral filtered scattering is collected, separated, and reflected by a concave holographic flat-field grating onto said photo-detector.

7. The biosensor of claim 6, wherein said spectral filtered scattering data is collected from said photo-detector and is displayed graphically by said signal display to provide an indication of said electromagnetic spectrum data comprising said Raman-scattering shift data.

8. The biosensor of claim 7, wherein said Raman-scattering shift data is compared with a database for sample identification.

9. A portable biosensor comprising:
   a sample filter cartridge comprising a 30 μm pore size mesh filter, a 1.0 μm pore size coarse filter, a 0.5 μm pore size medium filter, and a molecular-sieve bead-column;
   a filter collector;
   an optical sphere;
   a Raman spectrometer laser diode;
   a photo-detector configured to receive electromagnetic spectrum data;
   a processor in electrical communication with said photo-detector to receive said electromagnetic spectrum data from said photo-detector;
   a signal display in electrical communication with said processor and configured to provide an indication of said electromagnetic spectrum data;
   a vacuum pump; and
   a power supply.

10. The biosensor of claim 9, wherein said Raman spectrometer laser diode emits a deep ultra-violet radiation wavelength of 180 nm to 250 nm at a sample collected on said filter collector.

11. The biosensor of claim 10 wherein said sample collected on said filter collector absorbs said radiation and generates Raman-scattering shifts comprising finger-print spectral peaks that are about 30 nm longer than said emitted radiation in a fluorescence-free spectral region.

12. The biosensor of claim 11, wherein said optical sphere collects and uniformly distributes said Raman-scattering shifts at a wall of said optical sphere, causes said Raman-scattering shifts to exit said optical sphere and to pass through a spectral filter selected from the group consisting of a notch filter, a band-pass filter, and a long-pass spectral filter to produce spectral filtered scattering, wherein said spectral filter blocks scattering radiation produced by said electromagnetic radiation emitter.

13. The biosensor of claim 12, wherein said spectral filtered scattering is collected, separated, and reflected by a concave holographic flat-field grating onto said photo-detector.

14. The biosensor of claim 11, wherein said spectral filtered scattering data is collected from said photo-detector and is displayed graphically by said signal display to provide an indication of said electromagnetic spectrum data comprising said Raman-scattering shift data.

15. The biosensor of claim 14, wherein said Raman-scattering shift data is compared with a database for sample identification.

16. A portable biosensor comprising:
   a sample filter cartridge comprising a 30 μm pore size mesh filter, a 1.0 μm pore size coarse filter, a 0.5 μm pore size medium filter, and a molecular-sieve bead-column;
   a first air passage;
   a filter collector;
   an optical sphere;
   an electromagnetic radiation emitter;
   a photo-detector configured to receive electromagnetic spectrum data;
   a processor in electrical communication with said photo-detector to receive said electromagnetic spectrum data from said photo-detector;
   a signal display in electrical communication with said processor and configured to provide an indication of said electromagnetic spectrum data;
   a second air passage;
   a vacuum pump for drawing an air sample from said sample filter cartridge, through said first air passage, said filter collector, said optical sphere, and said second air passage and out said vacuum pump;
   a power supply in electrical communication with said electromagnetic radiation emitter, said photo-detector, said processor, said signal display, and said vacuum pump; and
   a housing that is sized for portability of said biosensor for field use;
   wherein said electromagnetic radiation emitter further comprises a Raman spectrometer laser diode that emits a deep ultra-violet radiation wavelength of 180 nm to 250 nm at a sample collected on said filter collector;
   wherein said sample collected on said filter collector absorbs said radiation and generates Raman-scattering shifts comprising finger-print spectral peaks that are about 30 nm longer than said emitted radiation in a fluorescence-free spectral region;
   wherein said optical sphere collects and uniformly distributes said Raman-scattering shifts at a wall of said optical sphere, causes said Raman-scattering shifts to exit said optical sphere and to pass through a spectral filter selected from the group consisting of a notch filter, a band-pass filter, and a long-pass spectral filter to produce spectral filtered scattering, wherein said spectral filter blocks scattering radiation produced by said electromagnetic radiation emitter;
   wherein said spectral filtered scattering is collected, separated, and reflected by a concave holographic flat-field grating onto said photo-detector;
   wherein said spectral filtered scattering data is collected from said photo-detector and is displayed graphically by said signal display to provide an indication of said electromagnetic spectrum data comprising said Raman-scattering shift data; and wherein said Raman-scattering shift data is compared with a database for sample identification.

\* \* \* \* \*